(12) United States Patent
Halim (10) Patent No.: US 8,725,579 B2
(45) Date of Patent: May 13, 2014

(54) DEVICE ID AND FINANCIAL INFORMATION (75) Inventor: Irwan Halim, Houston, TX (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 12/771,131

(22) Filed: Apr. 30, 2010

(65) Prior Publication Data

US 2011/0270694 A1 Nov. 3, 2011

(51) Int. Cl.
*G06Q 20/00* (2012.01)
*G06Q 40/00* (2012.01)

(52) U.S. Cl.
USPC ............................................. 705/18; 705/41

(58) Field of Classification Search
None
See application file for complete search history.

(56) References Cited

U.S. PATENT DOCUMENTS

| 5,781,723 | A | 7/1998 | Yee | |
|---|---|---|---|---|
| 6,643,701 | B1 | 11/2003 | Aziz | |
| 6,886,095 | B1 | 4/2005 | Hind | |
| 7,387,250 | B2 * | 6/2008 | Muni | 235/462.01 |
| 7,523,860 | B2 * | 4/2009 | Bonalle et al. | 235/380 |
| 8,028,896 | B2 * | 10/2011 | Carter et al. | 235/379 |
| 2002/0107745 | A1 * | 8/2002 | Loeser | 705/21 |
| 2002/0147600 | A1 * | 10/2002 | Waters et al. | 705/1 |
| 2006/0000895 | A1 * | 1/2006 | Bonalle et al. | 235/380 |
| 2006/0094466 | A1 * | 5/2006 | Tran | 455/558 |
| 2008/0040262 | A1 * | 2/2008 | D K et al. | 705/39 |
| 2009/0061901 | A1 * | 3/2009 | Arrasvuori et al. | 455/456.3 |
| 2009/0110248 | A1 * | 4/2009 | Masuda et al. | 382/118 |
| 2009/0233579 | A1 * | 9/2009 | Castell et al. | 455/411 |
| 2011/0251892 | A1 * | 10/2011 | Laracey | 705/14.51 |
| 2011/0271106 | A1 | 11/2011 | Hinkle | |

FOREIGN PATENT DOCUMENTS

| CN | 101303755 | 11/2008 | |
|---|---|---|---|
| EP | 1710980 A2 * | 10/2006 | ............. H04L 29/06 |
| KR | 20040068445 | 7/2004 | |
| KR | 20070103651 | 10/2007 | |
| KR | 20080096721 | 11/2008 | |

* cited by examiner

*Primary Examiner* — Matthew Gart
*Assistant Examiner* — Michael Maicher
(74) *Attorney, Agent, or Firm* — Fulbright & Jaworski LLP (57) ABSTRACT

A method including sending a device ID and financial information associated with a user of a device to a transaction device in response to receiving a transaction request from the transaction device, configuring an image capture device to capture an image of the user and send the image of the user to the transaction device, and configuring the transaction device to authenticate the financial information with the image of the user.

17 Claims, 8 Drawing Sheets

DEVICE ID AND FINANCIAL INFORMATION

BACKGROUND

When entering into a financial transaction, a user can approach a cash register. The cash register can be configured to display an amount and prompt the user to pay the displayed amount. The user can then select a method of payment from the user's wallet and proceed to provide the method of payment to the cash register. The method of payment can then be utilized to pay for the amount listed in the transaction and the transaction can be completed.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
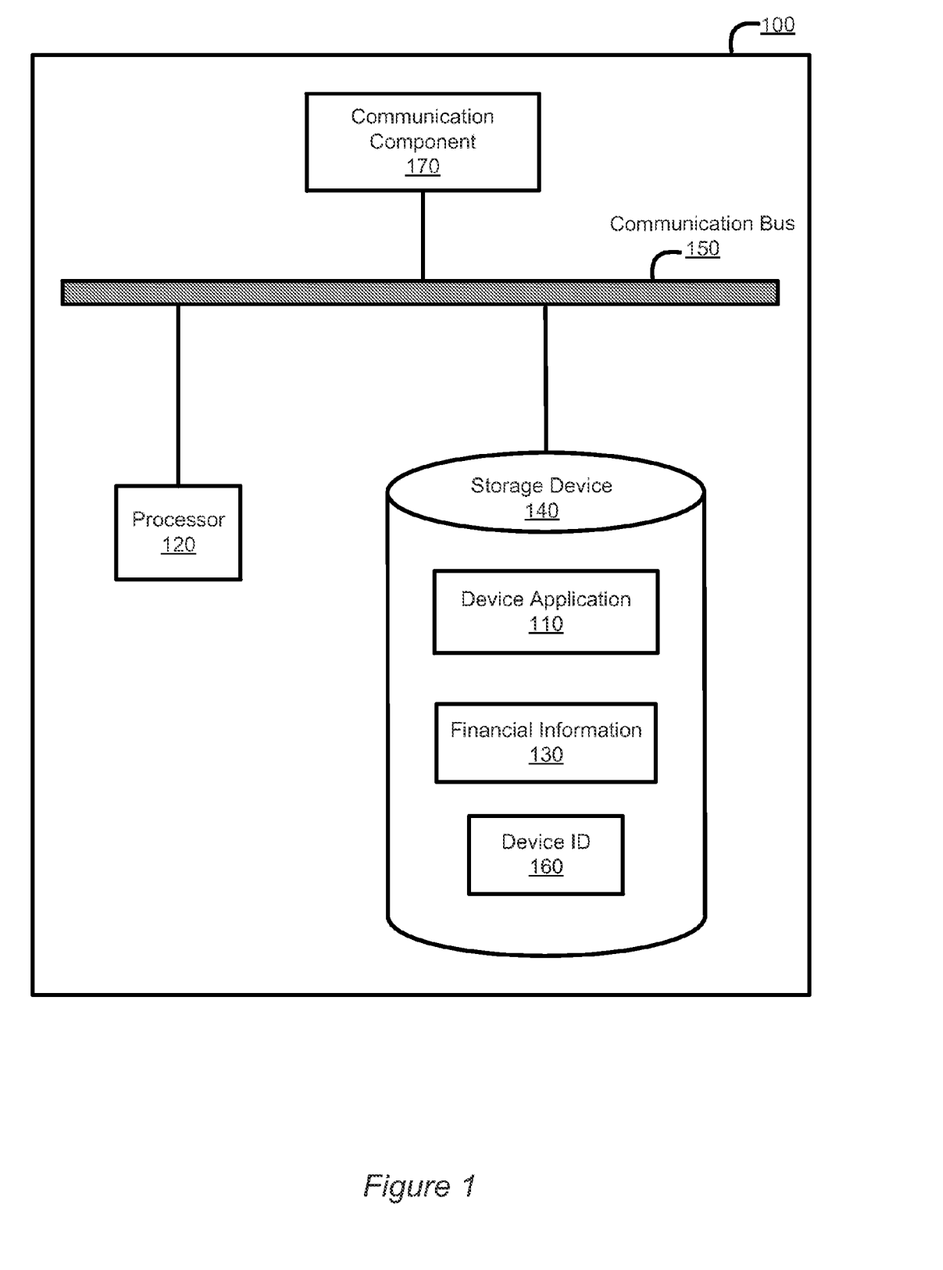
FIG. 1 illustrates a communication component coupled to a device according to an embodiment of the invention.

FIG. 1 illustrates a communication component 170 coupled to a device 100 according to an embodiment of the invention. In one embodiment, the device 100 is a desktop, a laptop, a netbook, and/or a server. In another embodiment, the device 100 can be cellular device, a PDA, and/or any other device which a communication component 170 can be coupled to.

As illustrated in FIG. 1, the device 100 is coupled to the communication component 170 and includes a processor 120, a storage device 140, and a communication bus 150 for the device 100 and/or one or more components of the device 100 to communicate with one another. Further, as illustrated in FIG. 1, the storage device 140 stores a device application 110, financial information 130, and a device ID 160. In other embodiments, the device 100 includes additional components and/or is coupled to additional components in addition to and/or in lieu of those noted above and illustrated in FIG. 1.

As noted above, the device 100 includes a processor 120. The processor 120 sends data and/or instructions to one or more components of the device 100, such as the storage device 140, the communication component 170, and the device application 110. Additionally, the processor 120 receives data and/or instruction from components of the device 100, such as the device application 110 and the communication component 170.

The device application 110 is an application which can be configured by the processor 120 to send a device ID 160 and financial information 130 associated with a user of the device 100 to a transaction device in response to receiving a transaction request from the transaction device. For the purposes of this application, the device ID 160 is an identification of the device 100 which is unique to the device 100 and is utilized by the transaction device to accurately identify the device 100. Additionally, the financial information 130 includes information corresponding to a user of the device 100 which can be utilized to complete or fund a financial transaction with the transaction device.

The transaction device can include a cash register and/or any point of sale device which the device 100 can complete a transaction with. Before completing the transaction, the device application 110 can configure a sensor or an image capture device to capture an image of the user and send the image to the transaction device. The device application 110 can then instruct the transaction device to authenticate the financial information 130 with the captured image of the user. In response to the financial information 130 being authenticated, a transaction between the device 100 and the transaction device can be authorized or rejected.

The device application 110 can be firmware which is embedded onto the device 100 and/or the storage device 140. In another embodiment, the device application 110 is a software application stored on the device 100 within ROM or on the storage device 140 accessible by the device 100. In other embodiments, the storage application 110 is stored on computer readable medium readable and is accessible by the device 100 or the storage device 140 from a different location.

Additionally, in one embodiment, the storage device 140 is included in the device 100. In other embodiments, the storage device 140 is not included in the device 100, but is accessible to the device 100 utilizing a network interface included in the device 100. The network interface can be a wired or wireless network interface card. In other embodiments, the storage device 140 can be configured to couple to one or more ports or interfaces on the device 100 wirelessly or through a wired connection.

In a further embodiment, the device application 110 is stored and/or accessed through a server coupled through a local area network or a wide area network. The device application 110 communicates with devices and/or components coupled to the device 100 physically or wirelessly through a communication bus 150 included in or attached to the device 100. In one embodiment the communication bus 150 is a memory bus. In other embodiments, the communication bus 150 is a data bus.

As noted above, the device application 110 is an application which can be configured by the processor 120 to send a device ID 160 and financial information 130 associated with a user of the device 100 to a transaction device. The device application 110 sends the device ID 160 and the financial information 130 in response to receiving a transaction request. In one embodiment, the transaction request is sent if the device 100 is determined to be within proximity of the transaction device.

The processor 120 and/or the device application 110 can initially send one or more instructions for the communication component 170 to scan for the transaction request. The communication component 170 is a device or component of the device 100 which is configured by the processor 120 and/or the device application 110 to communicate with the transaction device. When communicating with the transaction device, the communication component 170 can receive and/or send one or more signals or files.

The communication component 170 can communicate with the transaction device through a wireless or through a wired connection. In one embodiment, the communication component 170 can be or include an infra red device, a Bluetooth device, and/or a network device. In another embodiment, the communication component 170 can include a USB port, a mini-USB port, a firewire port, an ESATA port, and/or a serial port. In other embodiments, the communication component 170 can be or include additional devices and/or components configured to communicate with the transaction device through a wireless or wired connection.

When the communication component 170 detects a transaction request received from the transaction device, the communication component 170 can be configured to notify the device application 110 that a transaction request has been received. In response to receiving the transaction request, the device application 110 will determine that the device 100 is within proximity of the transaction device.

The transaction request is a signal and/or a file sent by a transaction device utilized to prompt the device 100 for a financial payment. Additionally, the transaction request can include a request for a device ID 160 of the device 100 and for financial information 130. The transaction request can be sent from the transaction device in response to a user of the device 100 presenting one or more items or services to the transaction device for purchase. In another embodiment, the transaction request can be sent by the transaction device in response to the transaction device offering an item or service for the user of the device 100 to purchase. In other embodiments, the transaction request is sent in response to a sensor or a communication device of the transaction device detecting the device 100.

Once the transaction request has been received, the device application 110 can access a device ID 160 of the device 100 and financial information 160 associated with a user of the device 100. The device application 110 can then configure the communication component 170 to send the device ID 160 and the financial information 130 to the transaction device. In one embodiment, when configuring the communication component, the device application 110 instructs the communication component to initiate a file transfer of the device ID 160 and the financial information 130.

As noted above, the device ID 160 is an identification of the device 100 which is unique to the device 100 and is utilized by the transaction device to accurately identify the device 100 and/or a user of the device 100. In one embodiment, the device ID 160 is a cellular ID of the device 100 or an international mobile equipment identity number (IMEI) of the device 100. In another embodiment, the device ID 160 can be or include an identification of the user, such as drivers license of the user and/or a social security number of the user. In other embodiments, the device ID 160 can be any sequence of numbers, characters, and/or signatures generated by the device 100 and/or by the user.

Additionally, one or more of the financial information 130 includes information corresponding to a user of the device 100 which can be utilized by the device 100 or a user of the device 100 to complete or fund a transaction with the transaction device. In one embodiment, the financial information 130 is a credit card of the user, a debit card of the user, a gift card of the user, and/or a bank account of the user.

Additionally, the financial information 130 can be or include an account number, an expiration date, a name of the user, a billing address of the user, and/or a security code associated with the user. One or more of the financial information 130 can be stored as one or more files on the storage device 140. In other embodiments, one or more of the financial information 130 can be stored on additional locations accessible to the device application 110.

In one embodiment, before sending the device ID 160 and the financial information 130, the device application 110 can prompt the user to authenticate himself/herself. When authenticating himself/herself, the user can access one or more input devices coupled to the device 100 and proceed to enter an authentication of himself/herself. An input device can include one or more numerical or character pads. In another embodiment, the input device can be or include an image capture device, a microphone, and/or a biometric sensor. In other embodiments, the input device can be any additional device which can be utilized by the device 100 to authenticate the user.

The device application 110 can configure the input device to capture an image of the user, a voice of the user, and/or any input entered by the user and compare the captured information to predefined information of the user stored on the device 100. If the captured information does not match the predefined information, the device application 110 can prompt the user to re-authenticate himself/herself and/or prohibit the sending of the device ID 160 and the financial information 130.

In another embodiment, if the captured information matches the predefined information, the device application 110 can allow the sending of the device ID 160 and the financial information 130. Additionally, if the device 100 includes more than one financial information 130 available on the device 100, the device application 110 can prompt the user to select one of the financial information 130 to send to the transaction device. One or more of the financial information 130 can be rendered on a display device of the device 100 for the user to select.

Once the user has been authenticated and a financial information 130 has been selected, the device application 110 can instruct the communication component 170 to send the device ID 160 and the selected financial information 130 to the transaction device. The device application 110 can then configure a sensor to capture information of the user. In one embodiment, the sensor is an image capture device configured to capture an image of the user for the transaction device to utilize when authenticating the financial information 130.

The image capture device is a device and/or component which can be configured by the device application 110 to capture an image of the user and share the image with the transaction device. Additionally, the image of the user can be a face of the user and/or a fingerprint of the user. In one embodiment, the image capture device is coupled or included in the device 100. In another embodiment, the image capture device is coupled or included in the transaction device.

Once the image of the user has been captured, the image of the user can be sent to the transaction device and/or the image can be shared with the transaction device. The device application 110 additionally instructs and/or configures the transaction device to authenticate the financial information 130 with the image of the user.

When authenticating the financial information 130 with the image of the user, the transaction device can be configured by the device application 110 and/or another application on the transaction device to compare the image of the user to a predefined image associated with the financial information 130. In response the financial information 130 being authenticated, a transaction between the device 100 and the transaction device can be approved or rejected.

Figure 2:
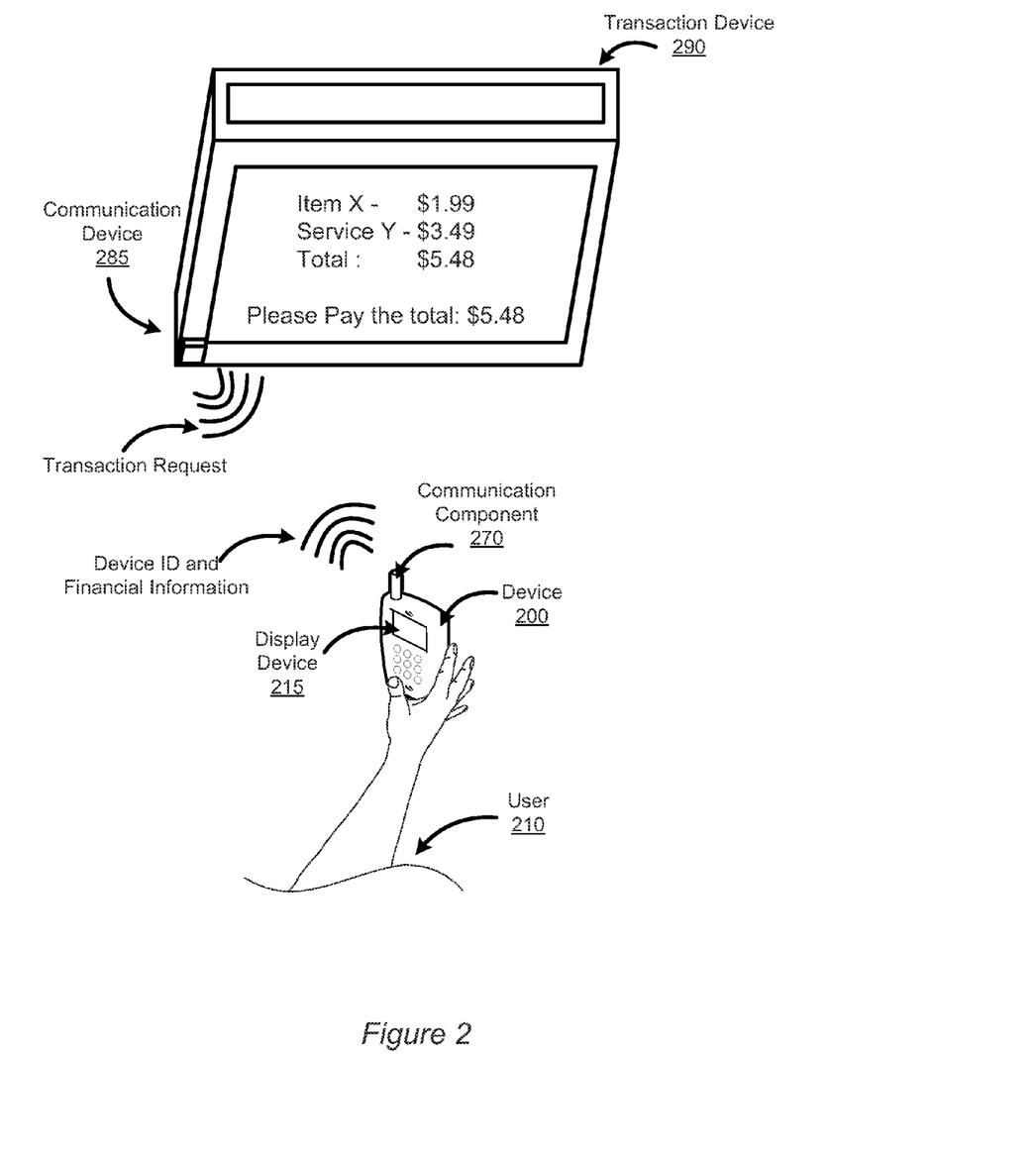
FIG. 2 illustrates a device communicating with a transaction device according to an embodiment of the invention.

FIG. 2 illustrates a device 200 communicating with a transaction device 290 according to an embodiment of the invention. As illustrated in FIG. 2, in one embodiment, the device 200 is or includes a cellular device. In other embodiments, the device 200 can be or include a PDA, a computing machine, and/or any other device a communication component 270 can be coupled to.

As illustrated in the present embodiment, the communication component 270 is a device and/or component coupled to the device 200 which can communicate with a transaction device 290. In one embodiment, the communication component 270 can include one or more radio devices configured to wirelessly communicate with the transaction device 290. The communication component 270 can include an infrared device, a Bluetooth device, and/or a wireless LAN device. In another embodiment, the communication component 270 can include one or more ports and or devices configured to physically couple with the transaction device 290.

When communicating with the transaction device 290, a device application of the device 200 configures the communication component 270 to scan for a transaction request sent from the transaction device. As noted above, the transaction device 290 is a device which can issue a transaction request to the device 200 and complete a financial transaction with the device 200. Additionally, the transaction device 290 can be utilized to complete a financial transaction between a user 210 of the device 200 and the transaction device 290 or a user of the transaction device 290. A user 210 can be any person who can access the device 200 and can have one or more financial information 130 of the user stored on the device 200.

Further, the transaction device 290 can authorize or reject a financial transaction between the user 210 of the device 200 and the transaction device 290 or an owner of the transaction device 290 in response to authenticating financial information received from the device 200. As illustrated in FIG. 2, in one embodiment, the transaction device 290 is a kiosk. In another embodiment, the transaction device 290 can be or include a cash register and/or any other point of sale device which can send a transaction request to the device 200.

As noted above, the transaction request is sent in response to the user 210 presenting one or more items or services to the transaction device 290 for purchase. The transaction request can list the items and/or services to be purchased and a total price for the items and/or services. As illustrated in FIG. 2, in one embodiment, the transaction device 290 has identified that the user 210 has presented item X and service Y for purchase. Additionally, a display of the transaction device 290 renders the transaction request and prompts the user to pay the amount of $5.48.

Further, as shown in FIG. 2, the transaction request is sent to the device 200 in response to the transaction device 290 detecting the device 200 within proximity of the transaction device 290. As illustrated in FIG. 2, the transaction device 290 includes a communication device 285. The communication device 285 is a component and/or device of the transaction device 290 configured to scan an environment around the transaction device 290 for the device 100. Additionally, the communication device 285 is configured by the transaction device 290 to send the transaction request and receive a device ID and financial information from the device 200.

The communication device 285 can include an infra red device, a Bluetooth device, and/or a wireless LAN device. In another embodiment, the communication device 285 can additionally include one or more ports or interfaces configured to physically engage and couple with the communication component 270 of the device 200. When scanning for the device 200, the communication device 285 can send and/or broadcast one or more signals and scan for a response from the device 200. If the transaction device 290 detects a response, the transaction device 290 will continue to broadcast one or more of the signals to include the transaction request.

Upon receiving the transaction request, the device application can configure a display device 215 of the device 200 to render the transaction request for display. A display device 215 is a component or device that can create and/or project one or more images and/or videos for display. In one embodiment, the display device 215 can be a monitor and/or a television. In another embodiment, the display device 215 is a projector that can project one or more images and/or videos. The display device 215 can include analog and/or digital technology. Additionally, the display device 215 can be coupled to the device 200 or the display device can be integrated as part of the device 200.

Utilizing the display device 215, the user 210 can review the transaction request and approve or disapprove sending the device ID and the financial information to the transaction device 290. If the user approves of the transaction request, the device application can configures communication component 270 to broadcast one or more signals or files in response. As illustrated in FIG. 2, one or more of the files can include the device ID and financial information associated with the user 210 of the device 200.

Figure 3:
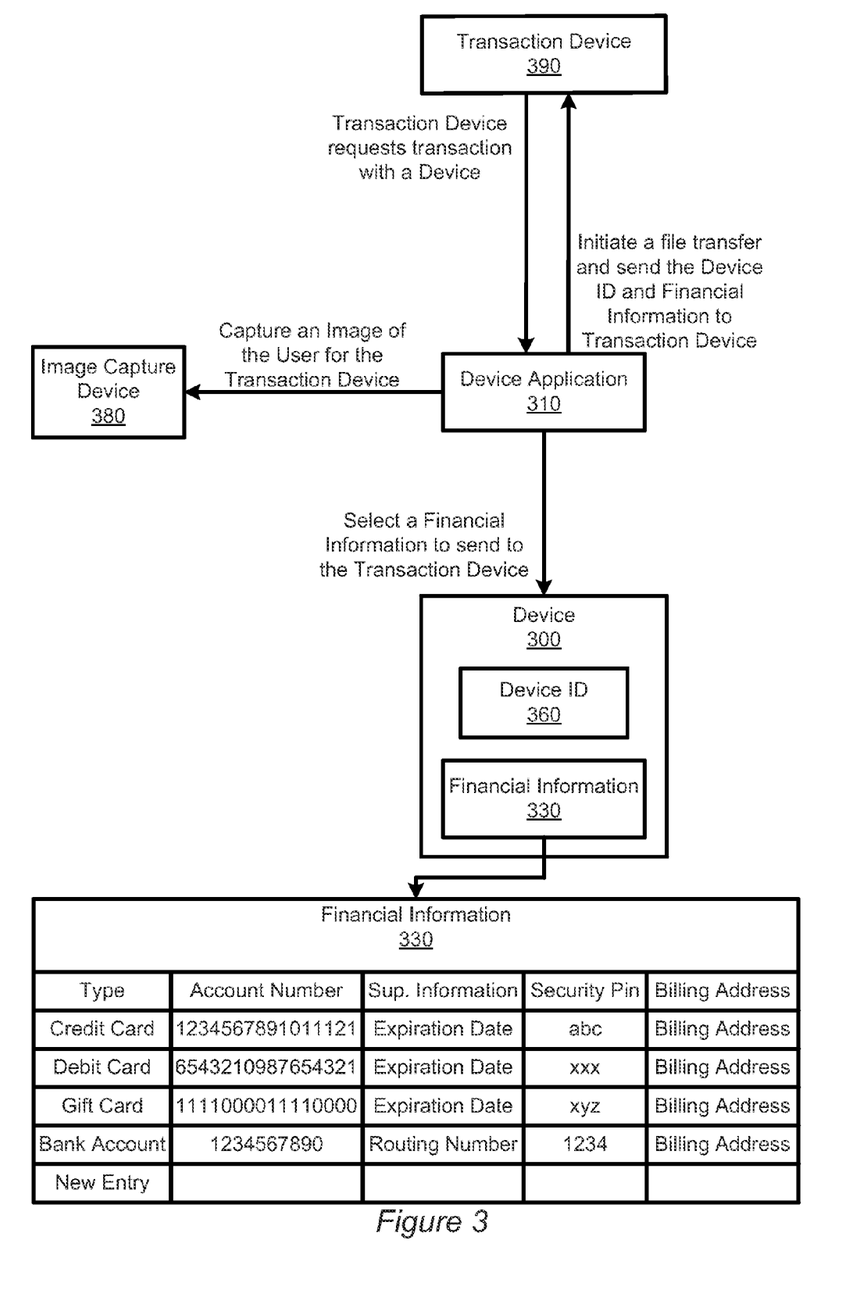
FIG. 3 illustrates a block diagram of a device application sending financial information to a transaction device and an image capture device capturing an image of a user according to an embodiment of the invention.

FIG. 3 illustrates a block diagram of a device application 310 sending financial information 330 to a transaction device 390 and configuring an image capture device 380 to capture an image of a user according to an embodiment of the invention. As noted above and as shown in the present embodiment, the transaction device 390 sends the device 300 a transaction request if the device 300 is within proximity of the transaction device 390. In response to receiving the transaction request, a device application 310 sends the device ID and financial information to the transaction device.

As illustrated in FIG. 3, the device ID 360 and the financial information 330 can be stored on the device 300. As noted above, the device ID 360 can include an IMEI of the device, a cellular ID of the device, a social security number of a user of the device, a driver's license number of a user of the device, and/or any sequence of numbers, characters, and/or signatures generated by the user or the device application.

Additionally, as shown in the present embodiment, the financial information 330 can be a credit card, a debit card, a gift card, and/or a bank account. Further, the financial information can list an account number, supplemental information (an expiration date or routing number), a security pin, and/or a billing address for any corresponding financial information.

Additionally, as noted above, if more than one financial information 330 is accessible to the device 300, the device application 310 can configure a display device render the available financial information 330 and prompt the user to select one of the financial information 330 to send to the transaction device 390. In another embodiment, a default financial information can be defined by the user or the device application 310. The device application 310 can automatically send the default financial information to the transaction device 390 in response to receiving a transaction request.

Once a financial information 330 has been selected, the device application 310 can configure the communication component to initiate a file transfer of the device ID 360 and the financial information. The device ID 360 and the financial information 330 can be sent as one or more files to the transaction device 390. Additionally, the device application 310 can prompt the transaction device 390 to authenticate the financial information 330 sent. In other embodiments, the device application 310 does not prompt the transaction device 390 to authenticate the financial information 330 and the transaction device 390 will automatically proceed to authenticate the financial information 330 in response to receiving the financial information 330 the device ID 360.

As noted above, when authenticating the financial information, the device application 310 sends one or more instructions for sensor, such as an image capture device 380, to capture information of the user. The information can include an image of the user accessing the device 300. Further, the captured image of the user can include a face of the user and/or a fingerprint of the user. Once the image of has been captured, the device application 310 proceeds to send and/or share the captured image with the transaction device 390.

As noted above, the image capture device 380 can be coupled to or be integrated as part of the device 300. In another embodiment, the image capture device 380 can be coupled or integrated as part of the transaction device 390. Utilizing the captured image, the transaction device 390 can be configured to authenticate the financial information 330 received from the device 300.

Figure 4:
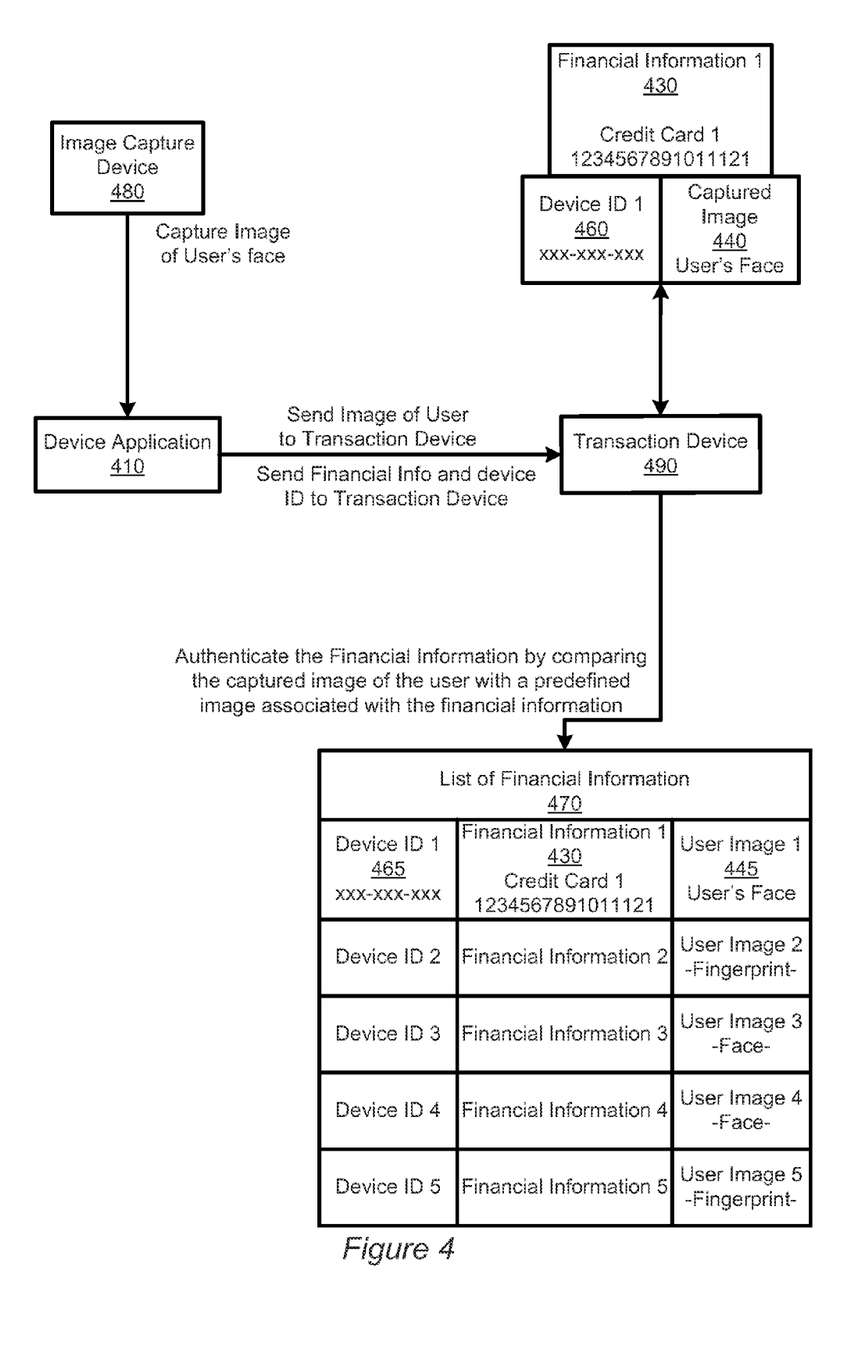
FIG. 4 illustrates a block diagram of financial information being authenticated according to an embodiment of the invention.

FIG. 4 illustrates a block diagram of financial information 430 being authenticated according to an embodiment of the invention. As noted above, the financial information 430 can be sent along with a device ID 460 from a device application 410 of a device. Additionally, the device application 410 can configure an image capture device 480 to capture an image 440 of a user accessing the device. As illustrated in FIG. 4, the image capture device 480 is configured to capture an image of the user's face. In other embodiments, the image capture device 480 is configured to capture an image of the user's fingerprint.

Once the image of the user has been captured, the captured image of the user 440 is sent and/or shared with the transaction device 490. Utilizing the device ID 460, the financial information 430, and the captured image of the user 440, the transaction device 490 will attempt to authenticate the financial information 430. As illustrated in FIG. 4, the transaction device 490 identifies that the financial information 430 includes credit card 1 (1234567891011121). Additionally, the device ID 460 includes an identification number of xxx-xxx-xxx. Further, the captured image 440 is an image of the user's face.

As noted above, when authenticating the financial information 430, the transaction device 490 will compare the captured image of the user 440 to a predefined image 445 associate with the financial information 430. In another embodiment, the transaction device 490 additionally compares the received device ID 460 to a predefined device ID 465 listed to be associated with the financial information 430.

As illustrated in FIG. 4, in one embodiment, the transaction device 490 will access a list of financial information 470. As shown in the present embodiment, the list of financial information 470 includes one or more financial information. Additionally, each of the financial information lists a corresponding device ID and a predefined image associated with the financial information. In one embodiment, the list of financial information 470 is stored on the transaction device 490. In another embodiment, the list of financial information 460 can be stored on an entity, a cellular provider, and/or on any other location accessible to the transaction device 490.

The transaction device 490 will scan the list of financial information 470 for financial information 1 430. As shown in FIG. 4, the transaction device 490 finds that financial information 1 430 is listed as the first entry. Additionally, the transaction device 490 determines that predefined device ID 1 465 and predefined user image 1 435 are listed to be associated with financial information 1 430. The transaction device 490 will then proceed to compare the predefined device ID 1 465 with the device ID 460 sent from the device application 410. Additionally, the transaction device 490 will compare the captured image of the user 440 with the predefined user image 1 445.

As illustrated in FIG. 4, the transaction device 490 finds that the predefined device ID 465, xxx-xxx-xxx, matches the received device ID 1 460, xxx-xxx-xxx. Additionally, the transaction device 490 determines that the captured image of the user 440, an image of the user's face, matches the predefined user image 1 435, an image of the user's face.

As a result, the transaction device 490 proceeds to successfully authenticate the financial information 430, since the predefined image 445 and the predefined device ID 465 listed to be associated with financial information 1 430 match the received device ID 460 and the captured image of the user 440. As noted above, in response to the transaction device 490 authenticating the financial information 430, a transaction between the device and the transaction device 490 can be authorized or rejected.

Figure 5:
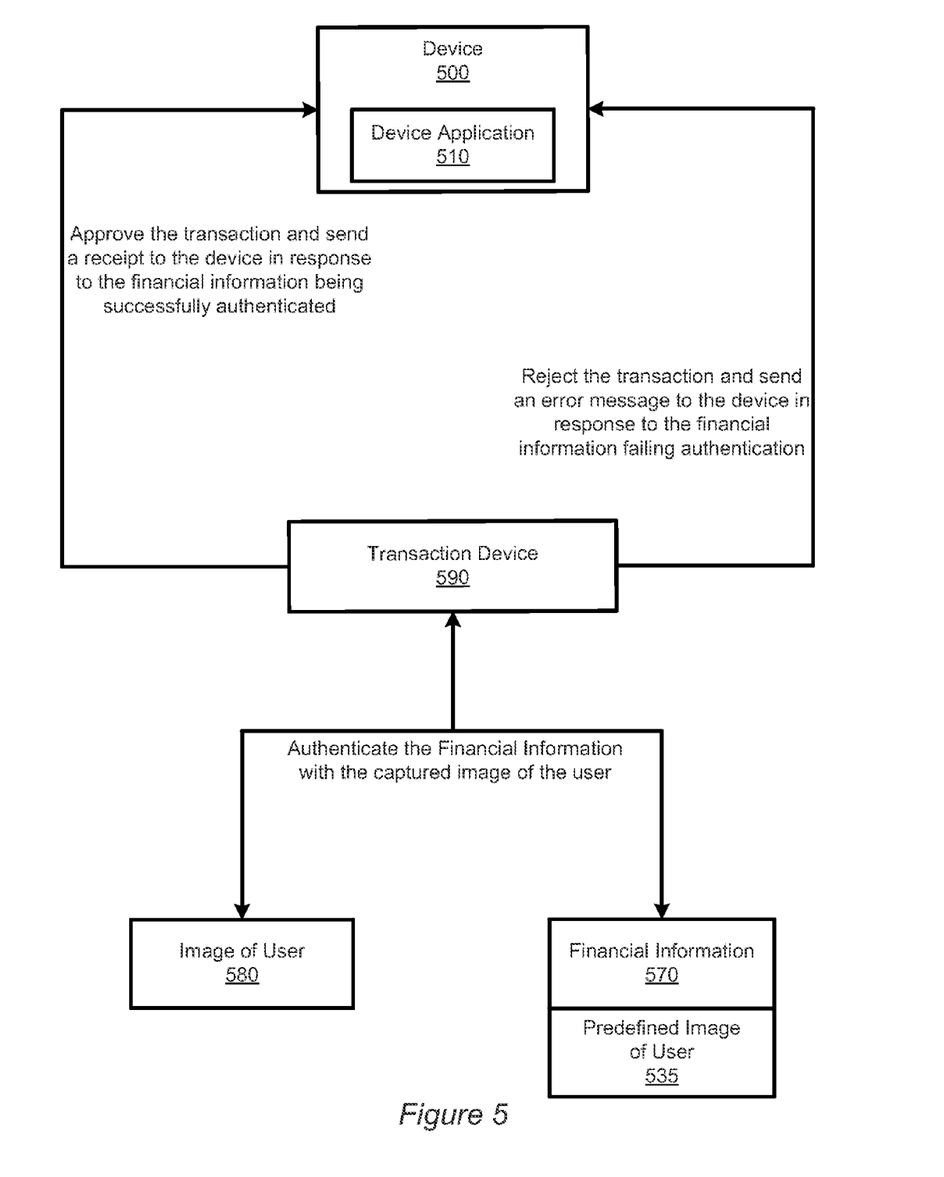
FIG. 5 illustrates a block diagram of a transaction being authorized or rejected according to an embodiment of the invention.

FIG. 5 illustrates a block diagram of a transaction being authorized or rejected according to an embodiment of the invention. As noted above, a transaction device 590 authenticates the financial information 570 by comparing a predefined image 535 associated with the financial information 570 to a captured image 580 of a user accessing the device 500. In another embodiment, the financial information 570 is further authenticated by comparing a received device ID to a predefined device ID associated with the financial information 570.

In one embodiment, if the captured image of the user 580 matches the predefined image of the user 535, the transaction device 590 will determine that the financial information 570 has been authenticated and the transaction between the device 500 the transaction device 590 will be authorized. In one embodiment, the transaction device 590 will additionally insure that the received device ID matches a predefined device ID before authorizing the transaction. If the transaction is authorized, the transaction device 590 can proceed to charge the financial information 570 for the amount listed in the transaction.

Additionally, the transaction device 590 can be configured by the device application 510 to send the device 500 a receipt of the transaction. The receipt can be a digital file which includes details of the financial information 570 being charged for the items or services purchased by the user. In one embodiment, the device application 510 can additionally configures a display device of the device 500 to render the receipt for the user to view.

In another embodiment, the financial information 570 fails authentication if the received device ID does not match the predefined device ID or the captured image 580 of the user does not match the predefined image 535 listed to be associated with the financial information 570. In response, the transaction device 590 will reject the transaction between the device 500 and the transaction device 590.

In one embodiment, if the transaction is not authorized and/or is rejected, the transaction device 590 can send the device 500 an error message, indicating that the transaction was not successful. The device application 510 can then proceed to configure the display device of the device 500 to render the error message for the user to review. In one embodiment, the device application 510 additionally prompts to the user to select another financial information and device ID to send to the transaction device 590.

Figure 6:
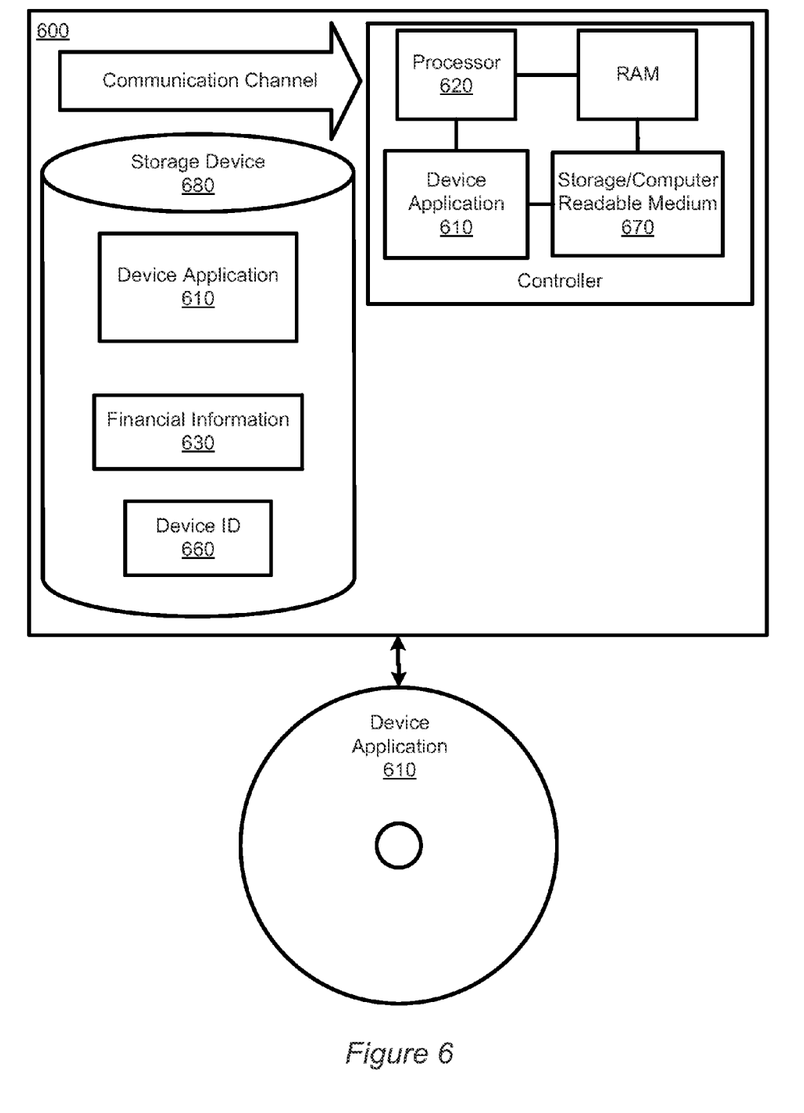
FIG. 6 illustrates a device with an embedded device application and a device application stored on a removable medium being accessed by the device according to an embodiment of the invention.

FIG. 6 illustrates a device 600 with an embedded device application 610 and a device application 610 stored on a removable medium being accessed by the device 600 according to an embodiment of the invention. For the purposes of this description, a removable medium is any tangible apparatus that contains, stores, communicates, or transports the application for use by or in connection with the device 600. As noted above, in one embodiment, the device application 610 is firmware that is embedded into one or more components of the device 600 or the storage device 640 as ROM. In other embodiments, the device application 410 is a software application which is stored and accessed from a hard drive, a compact disc, a flash disk, a network drive or any other form of computer readable medium that is coupled to the device 600.

Figure 7:
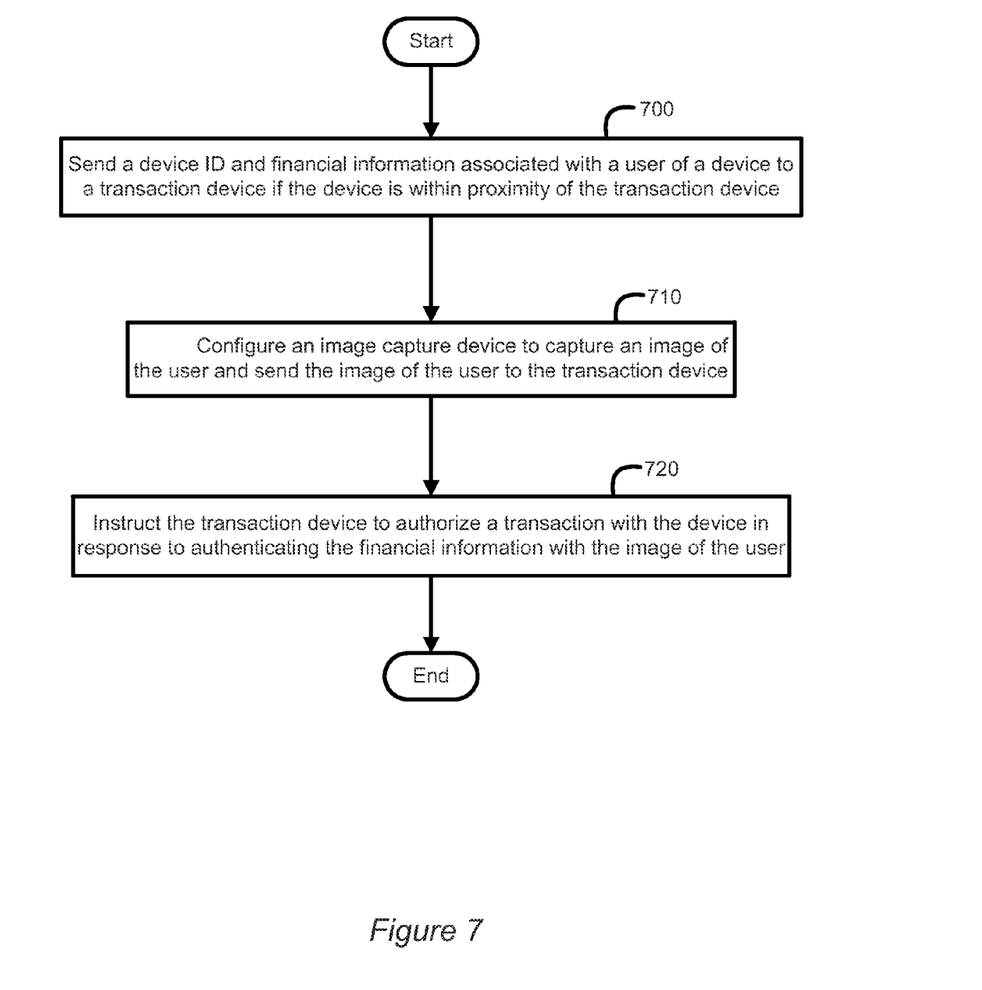
FIG. 7 is a flow chart illustrating a method for authenticating financial information according to an embodiment of the invention.

FIG. 7 is a flow chart illustrating a method for authenticating financial information according to an embodiment of the invention. The method of FIG. 7 uses a device coupled to a communication component, a storage device, a processor, a device application, financial information from the device, and a device ID of the device. In other embodiments, the method of FIG. 7 uses additional components and/or devices in addition to and/or in lieu of those noted above and illustrated in FIGS. 1, 2, 3, 4, 5, and 6.

As noted above, a processor of the device initially sends one or more instructions for a device application to configure the communication component to scan for a transaction request. As noted above, the communication component is a component or device configured to communicate with a transaction device. The communication component can communicate with the transaction device through a wireless or through a physical connection. In one embodiment, the communication component includes an infrared device, a Bluetooth device, a network device, and/or a wireless LAN device. In another embodiment, the communication component includes one or more ports or interfaces configured to physically couple with and engage the transaction device.

When communicating with the transaction device, the communication component can scan for and receive one or more signals or files, such as a transaction request. Additionally, the communicating component can send one or more signals or files to the transaction device. The transaction device can be any device and/or computing machine which can send a transaction request and complete a transaction with the device. The transaction request is a request sent prompting the device for a payment for one or more items or services. The transaction request can list one or more items, services, and/or an amount for the device to pay. Additionally, the transaction request can be sent by the transaction device in response to the device being within proximity of the transaction device.

As noted above, the transaction device can include a communication device configured to scan an environment around the transaction device for the device. In one embodiment, the transaction device sends and/or broadcasts one or more signals to the device and scans for a response. If a response is detected, the transaction device will determine that the device is within proximity of the transaction device and proceed to send the transaction request.

In response to receiving the transaction request and being within proximity of the transaction device, the device application can configure the communication component to send a device ID and financial information associated with a user of the device to the transaction device 700. In one embodiment, the device application can additionally configure a display device of the device to render the transaction request for the user to view before sending the device ID and the financial information.

As noted above, when sending the device ID and the financial information, the communication component can initiate a file transfer to the transaction device with the device ID and the financial information. The device ID is a unique identification of the device utilized by the transaction device to accurately identify the device. The device ID can include an IMEI of the device, a cellular ID of the device, a driver's license of a user of the device, and/or a social security number of a user of the device. In other embodiments, the device ID can include any sequence of numbers, characters, and/or signatures generated by the device or a user of the device.

Additionally, as noted above, the financial information includes information associated with a credit card, a debit card, a gift card, and/or a bank account of a user of the device. In one embodiment, the financial information can additionally includes an account number, an expiration date, a number of the user, a billing address of the user, a security code for the user, and/or any supplemental information for the financial information.

Once the device ID and the financial information have been sent to the transaction device, the device application can configure a sensor to capture information of the user. In one embodiment, the sensor is an image capture device and the device application instructs the image capture device to capture an image of the user accessing the device 710. The image of the user can include an image of the user's face or an image of the user's fingerprint.

Additionally, the image capture device can be coupled to or integrated as part of the device. In another embodiment, the image capture device is coupled the transaction device and the device application sends one or more instructions for the transaction device to capture an image of the user. Once the image has been captured, the device application can send the image or share the image with the transaction device.

Further, the device application can send one or more instructions for the transaction device to authorize a transaction with the device in response to authenticating the financial information with the captured image of the user 720. As noted above, when authenticating the financial information, the transaction device accesses a list of financial information. The list of financial information can include one or more financial information and list a corresponding predefined device ID and/or a predefined image associated with the financial information. In one embodiment, the list of financial information is stored on the transaction device. In other embodiments, the list of financial information can be stored on additional locations accessible to the transaction device.

The transaction device can access the list of financial information and scan the list for one or more financial information which matches the received financial information. If a match is found, the transaction device will identify a predefined device ID and a predefined image associated with the financial information in the list.

The transaction device will then compare the predefined device ID with the received device ID. Additionally, the transaction device will compare the predefined image with the captured image of the user. If the predefined device ID matches the received device ID and the predefined image matches the captured image of the user, the transaction device will determine that the financial information was successfully authenticated. In response, the transaction device will authorize the transaction and proceed to charge the received financial information for an amount listed in the transaction request.

In another embodiment, if the predefined device ID does not match the received device ID or if the predefined image does not match the captured image of the user, the transaction device will determine that authentication of the financial information has failed. In response, the transaction device will deny the transaction between the device and the transaction device and send an error message to the device. In other embodiments, the method of FIG. 7 includes additional steps in addition to and/or in lieu of those depicted in FIG. 7.

Figure 8:
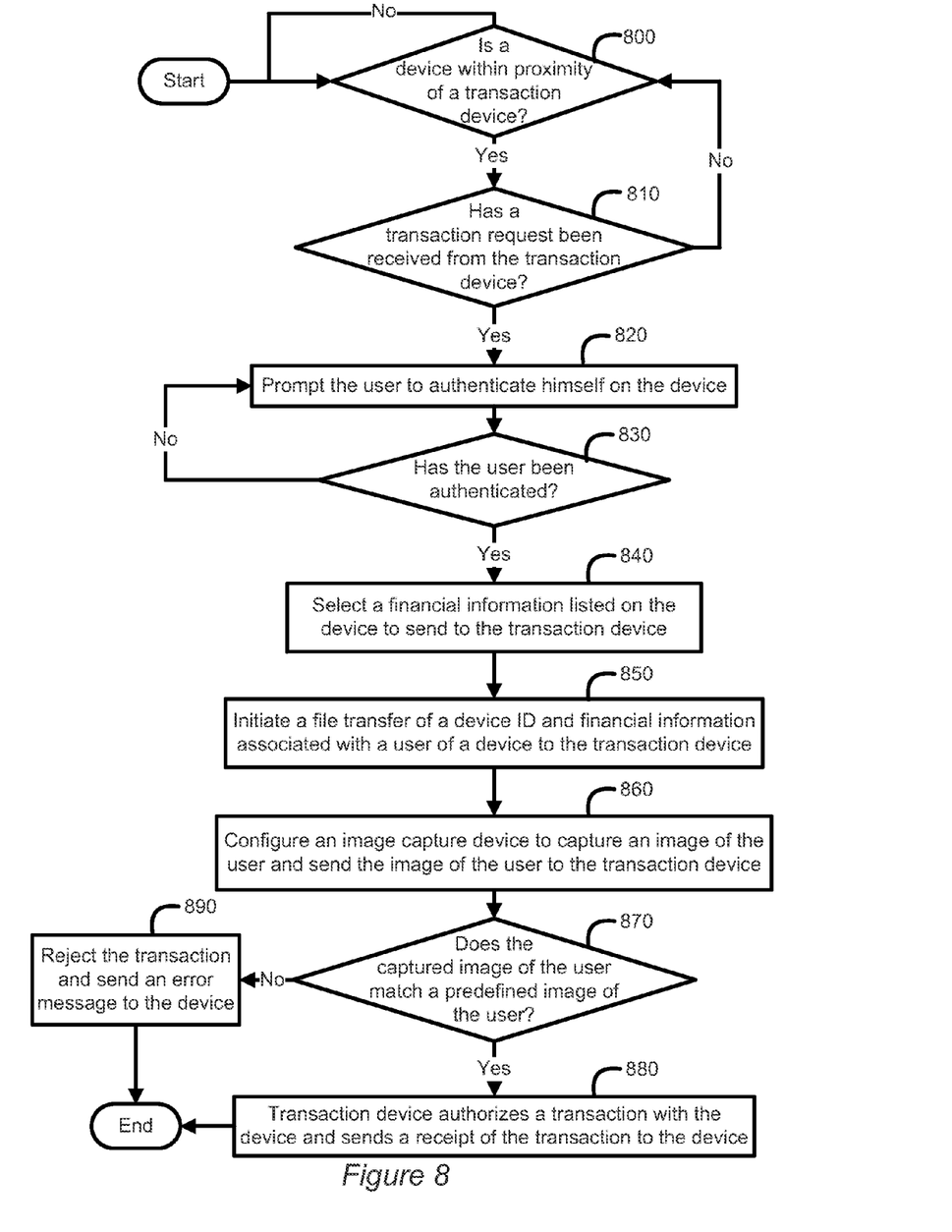
FIG. 8 is a flow chart illustrating a method for authenticating financial information according to another embodiment of the invention.

FIG. 8 is a flow chart illustrating a method for authenticating financial information according to another embodiment of the invention. Similar to the method of FIG. 7, the method of FIG. 8 uses a device coupled to a communication component, a storage device, a processor, a device application, financial information from the device, and a device ID of the device. In other embodiments, the method of FIG. 8 uses additional components and/or devices in addition to and/or in lieu of those noted above and illustrated in FIGS. 1, 2, 3, 4, 5, and 6.

As noted above, a transaction device can initially be configured to scan for a user of a device presenting one or more items or services to be purchased. The transaction device is a device or component which can communicate with a device and can be used to complete a financial transaction with the device or a user of the device. In one embodiment, the transaction device can be a cash register, a kiosk, or any other point of sale device.

The transaction device can include one or more communication devices configured to scan for the user presenting and/or selecting one or more items or services for purchase. If the transaction device detects the user selecting one or more items or purchases, the transaction device will proceed to configure the communication device to scan an environment around the transaction to determine whether a device is present. As noted above, when scanning for the device, the communication device can emit and one or more signals or files and scan for a response.

The device can be a device or computing machine configured to communicate with the transaction device through a communication component of the device. In one embodiment, the device is a cellular device, a PDA, and/or a computing machine. As noted above, the device includes a device application configured to determine whether the device is within proximity of the transaction device 800. When determining whether the device is within proximity of the transaction device, the device application configures the communication component to scan for one or more signals sent from the transaction device. If no signal is detected by the communication component, the communication will continue to scan for one or more signals from the transaction device to determine whether the device is within proximity of the transaction device 800.

Upon receiving and/or detecting one or more of the signals and/or files, the device application will determine that it is within proximity of the transaction device. In one embodiment, if a signal is detected, the device application can additionally emit a response instructing the transaction device to issue a transaction request. Upon receiving the instruction, the transaction device proceeds to generate the transaction request and sends the transaction request to the device through a signal or a file. As noted above, the transaction request can list one or more items and/or services to be paid for. Additionally, the transaction request can list the price for each of the items or services and a total of the prices.

After sending the instruction to generate the transaction request, the device application configures the communication component to scan for the transaction request and determine whether the transaction request has been received from the transaction device 810. If no transaction request is received, the communication component will continue to scan for the transaction request 810. In one embodiment, once the communication component has received the transaction request, the device application will prompt the user of the device to authenticate himself/herself 820.

As noted above, the device can include one or more input devices configured to receive input from the user when authenticating the user. In one embodiment, the input device can include a numerical/character pad, a biometric device, and/or an image capture device. The user can access the input device and enter one or more input or capture an image of himself/herself.

The device application can then compare the captured information to predefined information of the user and determine whether the user has been authenticated 830. If the captured information does not match the predefined information, the device application will determine that the user has not been authenticated and the device application will continue to prompt the user to authenticate himself/herself 820.

In another embodiment, if the captured information matches the predefined information, the device application will proceed to select financial information from the device to send to the transaction device 840. As noted above, the device can have a default financial information which is automatically chosen to be sent to the transaction device when a transaction request is received. In another embodiment, if the device includes more than one financial information, the device application can render one or more of the financial information for display on a display device of the device. Additionally, the device application can prompt the user to select one of the financial information.

Once a financial information has been selected, the device application can configure the communication component to initiate one or more file transfers of the financial information and a device ID to the transaction device 850. Additionally, the device application can configure a sensor or an image capture device to capture information or an image of the user. The sensor or image capture device is a component or device accessible to the device application and configured to capture information of the user, such as an image of the user's face or the user's fingerprint.

In one embodiment, the image capture device is coupled to or integrated as part of the device. In other embodiments, the image capture device is not coupled to the device, but is accessible to the device application through a wired or a wireless connection. Upon capturing an image of the user, the device application can send and/or share the image with the transaction device 860.

Utilizing the received device ID, the received financial information, and the captured information of the user, the device application sends one or more instructions for the transaction device to authenticate the financial information. When authenticating the financial information, the transaction device accesses a list of financial information to locate the financial information and identify a corresponding predefined image associated with the financial information.

If the transaction device locates the financial information in the list of financial information, the transaction device can be configured by the device application to determine whether the captured image of the user matches the predefined image associated with the financial information 870. In another embodiment, the transaction device additionally identifies a corresponding predefined device ID listed to be associated with the financial information and proceeds to determine whether the predefined device ID matches the device ID sent by the device.

If the transaction device determines that the predefined image associated with the financial information matches the captured image of the user, the transaction device will determine that authentication of the financial information was successful and proceed to authorize a transaction with the device. Additionally, the transaction device sends a receipt of the transaction to the device 880. In one embodiment, the transaction device will additionally insure that the predefined device ID associated with the financial information matches the received device ID before authorizing the transaction and sending the device a transaction receipt 880.

In another embodiment, if the captured image of the user does not match the predefined image associated with the financial information or if the received device ID does not match the predefined device ID associated with the financial information, the transaction device will reject the transaction and send an error message to the device 890. In response to receiving the error message, the device application can prompt the user to select another financial information to send to the transaction device and the process can be repeated. In other embodiments, the method of FIG. 8 includes additional steps in addition to and/or in lieu of those depicted in FIG. 8.

By sending a device ID and financial information associated with a user of a device in response to receiving a transaction request, a user friendly experience can be created for a user when entering into or completing a financial transaction with a transaction device. Additionally, by sending or sharing a captured image of the user with the transaction device; the financial information can accurately and securely be authenticated in response to comparing the captured image with a predefined image listed to be associated with the financial information. As a result, an efficient, secure, and convenient financial transaction experience can be created for the user of the device.

What is claimed is:

1. A method comprising:
    authenticating a user of a portable computing device with an alphanumeric input component of the portable computing device in response to receiving a transaction request from a transaction device not physically coupled to the portable computing device;
    wherein the transaction device sends the portable computing device the transaction request if the portable computing device is within proximity of the transaction device;
    displaying a plurality of financial information available on the portable computing device and prompting the user to select at least one of the plurality of financial information to wirelessly send to the transaction device;
    wirelessly sending, by the portable computing device, a device ID and the selected financial information associated with the user of the portable computing device to the transaction device in response to the user being authenticated by the portable computing device;
    capturing an image of the user with an image capture device and wirelessly sending, by the portable computing device, the image of the user to the transaction device; and
    instructing, by the portable computing device, the transaction device to authenticate the selected financial information with the image of the user sent by the portable computing device to the transaction device.

2. The method of claim 1 wherein authenticating the selected financial information includes the transaction device comparing the captured image of the user to a predefined image of the user associated with the selected financial information.

3. The method for claim 1 wherein a transaction between the portable computing device and the transaction device is authorized if the image of the user matches a predefined image of the user associated with the selected financial information.

4. The method of claim 1 further comprising configuring the portable computing device to scan for the transaction request sent from the transaction device.

5. The method of claim 4 wherein the portable computing device initiates a file transfer of the device ID and the selected financial information in response to the receiving of the transaction request.

6. The method of claim 1 wherein the transaction request is sent by the transaction device in response to a communicating device of the transaction device detecting the portable computing device being within proximity of the transaction device.

7. A portable computing device comprising:
    a wireless communication component to wirelessly receive a transaction request from a transaction device not physically coupled to the portable computing device;
    wherein the transaction device transmits the transaction request in response to detecting the portable computing device within proximity of the transaction device;
    an alphanumeric input component to detect an authentication from a user of the portable computing device if the transaction request is received;
    an image capture component to capture an image of the user; and
    a processor to:
        display a plurality of financial information available on the portable computing device and prompt the user to select at least one of the plurality of financial information to wirelessly send to the transaction device;
        authenticate the user and wirelessly transmit a device ID and the selected financial information of the user to the transaction device if the user is successfully authenticated and if the portable computing device is within proximity of the transaction device; and
        instruct the transaction device to authenticate the selected financial information with the captured image of the user sent by the portable computing device to the transaction device.

8. The portable computing device of claim 7 further comprising a storage device configured to store the plurality of financial information associated with the user accessing the portable computing device.

9. The portable computing device of claim 7 wherein the image captured by the image capture component includes at least one from the group consisting of a fingerprint of the user and a face of the user.

10. The portable computing device of claim 7 wherein the device ID includes at least one from the group consisting of a cellular ID of the portable computing device and an International Mobile Equipment Identity number of the portable computing device.

11. The portable computing device of claim 7 wherein the wireless communication component includes at least one from the group consisting of an infra red device, a bluetooth device, and a network device.

12. The portable computing device of claim 7 wherein the selected financial information includes at least one from the group consisting of a credit card of the user, a debit card of the user, and a bank account of the user.

13. The portable computing device of claim 7 wherein the financial information includes at least one from the group consisting of an account number, an expiration date, a name of the user, a billing address of the user, and a security code for the user.

14. The portable computing device of claim 7 wherein the transaction device includes at least one from the group consisting of a cash register and a point of sale device.

15. A non-transitory computer readable medium comprising instructions executed by a portable computing device to cause the portable computing device to:
   authenticate a user of the portable computing device with an alphanumeric input component of the portable computing device in response to wirelessly receiving a transaction request from a transaction device not physically coupled to the portable computing device;
   wherein the transaction device transmits the transaction request in response to the portable computing device being within proximity of the transaction device;
   display a plurality of financial information available on the portable computing device and prompt the user to select at least one of the plurality of financial information to wirelessly send to the transaction device;
   wirelessly send an International Mobile Equipment Identity (IMEI) number of the portable computing device and the selected financial information associated with the user to the transaction device in response to the user being authenticated by the portable computing device; and
   capture an image of the user with an image capture device and wirelessly send the image of the user, to the transaction device for the transaction device to authenticate the selected financial information with the image of the user sent by the portable computing device to the transaction device.

16. The non-transitory computer-readable medium of claim 15 wherein the instructions cause the portable computing device to further receive a receipt of a transaction from the transaction device in response to the financial information being authenticated.

17. The non-transitory computer-readable medium of claim 15 wherein the instructions cause the portable computing device to further receive an error message from the transaction device if the transaction device fails to authenticate the financial information with the image of the user.

* * * * *